United States Patent Office 3,444,757
Patented May 20, 1969

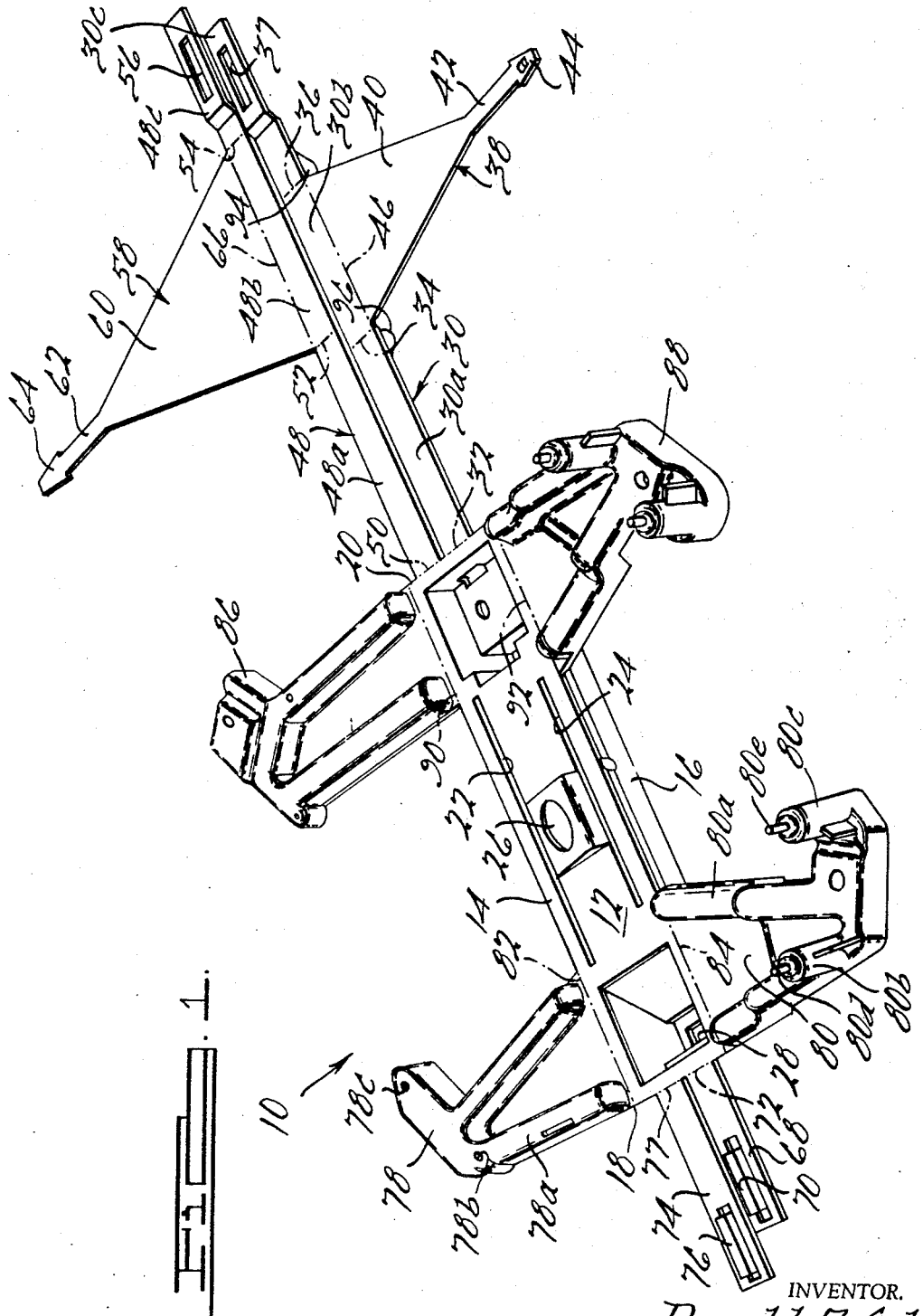

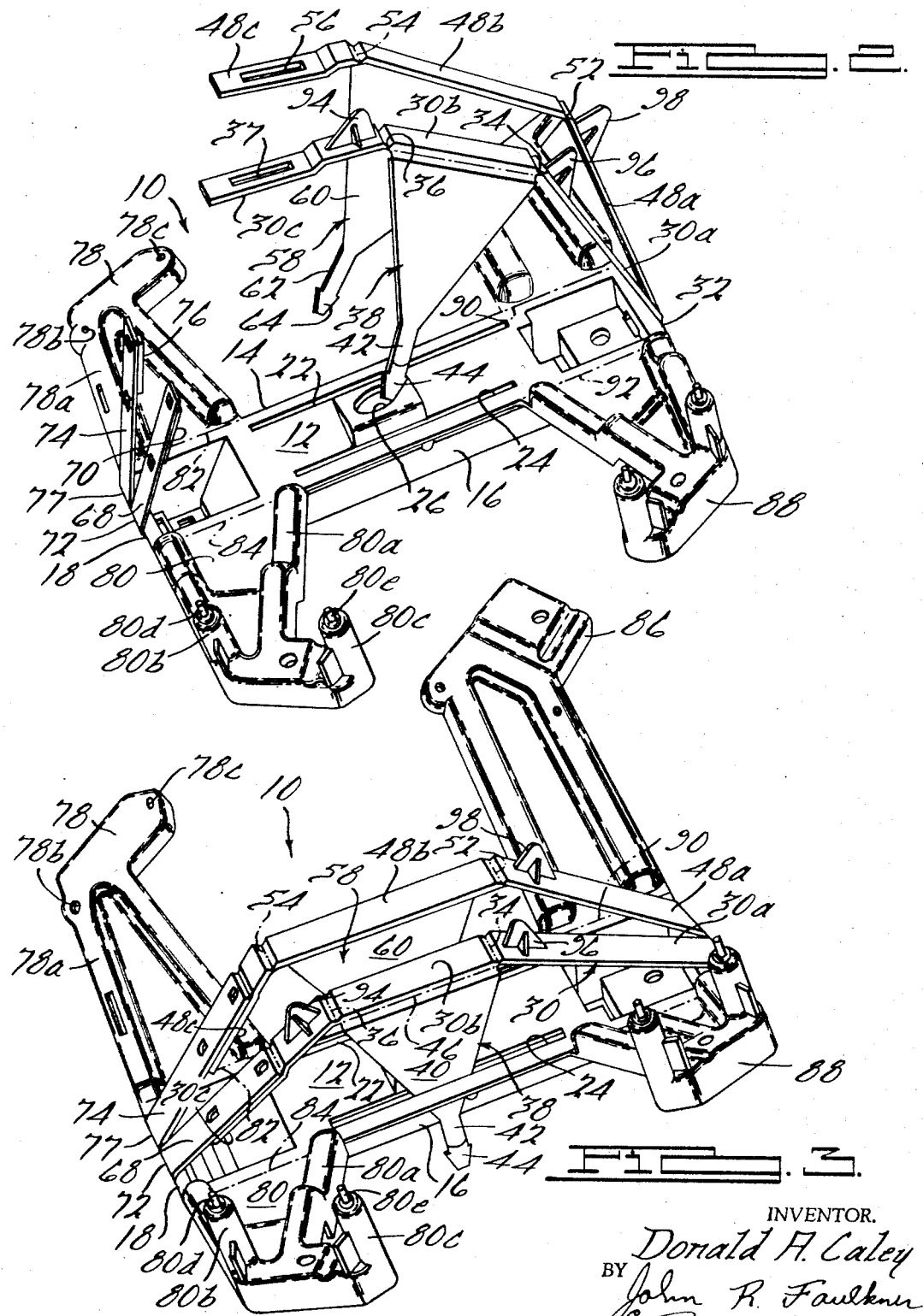

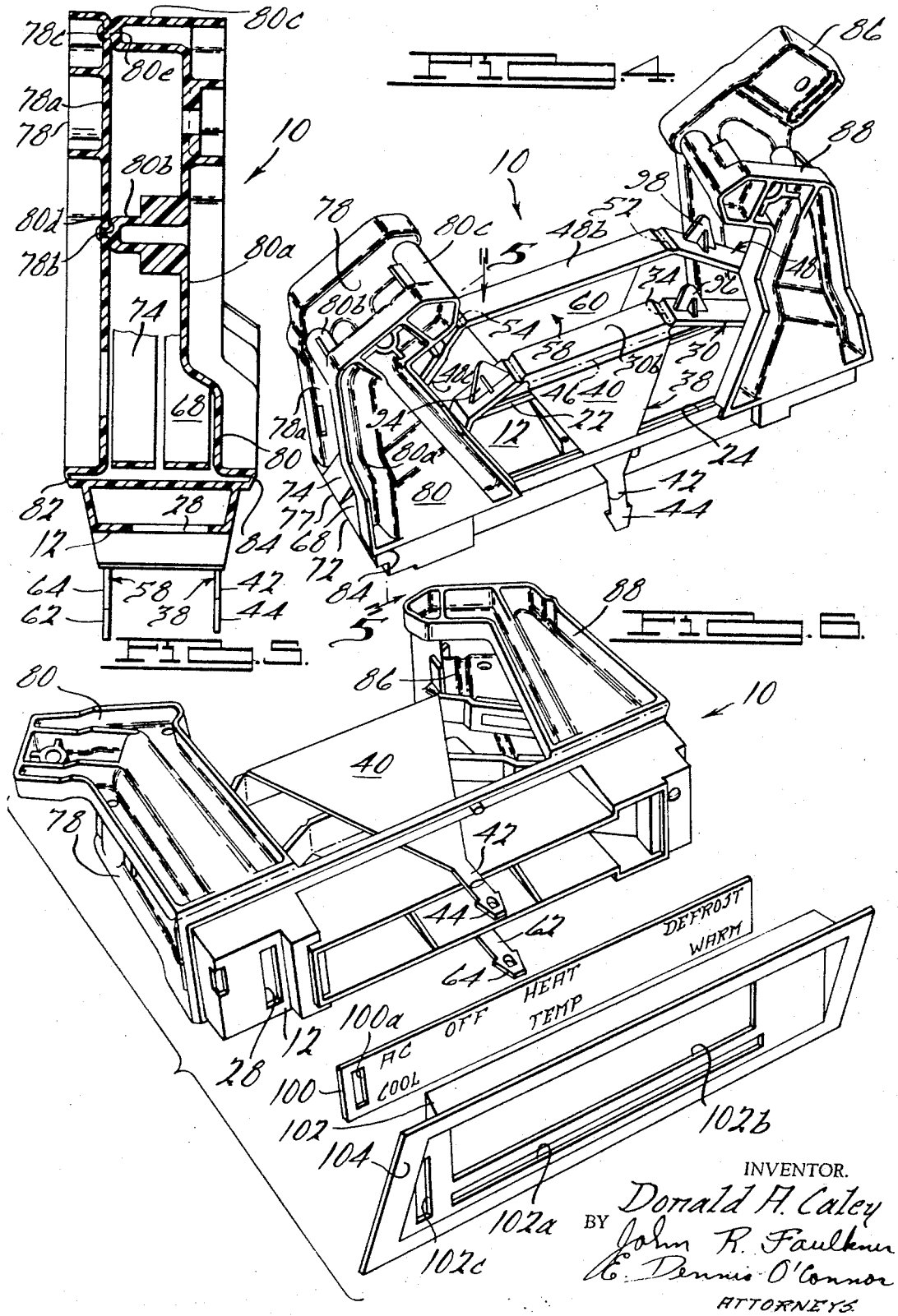

3,444,757
ONE-PIECE VEHICLE CLIMATE CONTROL
ACTUATING DEVICE
Donald A. Caley, Dearborn Heights, Mich., assignor to
Ford Motor Company, Dearborn, Mich., a corporation of Delaware
Filed Aug. 2, 1967, Ser. No. 657,887
Int. Cl. G05g 1/04
U.S. Cl. 74—523                                    12 Claims

ABSTRACT OF THE DISCLOSURE

A device for actuating the climate control mechanisms of a motor vehicle comprising a one-piece, generally planar, plastic molding having a main body and at least a pair of legs hingedly connected to the main body. An operating lever is hingedly connected to one of the legs. The hinged connections are formed by reducing the thickness of the plastic along a selected length thereof to allow the molding to be folded so that the legs may be joined to form a closed loop with the main body. The operating lever, to which control cables may be operatively attached, is then positioned so that it extends through an aperture in the main body.

Background of the invention

Motor vehicle climate control mechanisms, including heaters, fresh air vents and air conditioners, conventionally are controlled by the vehicle operator by the manual manipulation of a plurality of control levers that project through the vehicle instrument panel into the passenger compartment. These levers are secured for the desired orientation and movement by mounting brackets and other structural components located on the side of the instrument panel remote from the passenger compartment. The levers are operatively connected to the vehicle climate control mechanism by control wires or cables. The control levers, mounting brackets and structural components comprise the vehicle climate control actuating assembly.

It is the object of this invention to provide a unitary device that will function satisfactorily in a motor vehicle in place of the conventional climate control actuating assembly. Such a device may be molded from plastic material, thereby greatly simplifying manufacturing operations. The one-piece plastic construction of the device provides simplicity of design and reliability of operation as well as a decrease in the weight of vehicle components. Conventional control wires easily may be attached to this device to transmit desired movement to the vehicle climate control mechanisms.

Summary of the invention

A climate control actuating device constructed in accordance with this invention comprises a molding of plastic material having an elongate main body including a pair of sides and a pair of ends, the length of said ends being less than the length of said sides. The main body has a slot formed therethrough and an elongate projection extending from one end of the main body and attached thereto by first integrally molded hinge means. The longitudinal axis of the projection is substantially parallel to the longitudinal axis of the main body. The projection has two portions attached to one another by second integrally molded hinge means. A manually operable control lever extends from said projection transversely of the longitudinal axis of the latter and is attached to the projection by third integrally molded hinge means. The thickness of the operating lever is less than the width of the slot formed in the main body. A pair of attachment elements, capable of being interlocked, are oriented such that one of the elements is attached to the end of the projection remote from the first hinge means by fourth integrally molded hinge means and the other of the attachment elements is attached to the other end of said main body by fifth integrally molded hinge means. The first to fifth hinge means discussed above permit the parts of the device to be manipulated so that the attachment elements are interlocked and the control lever extends through the slot. The hinge means are formed on the molding by decreasing the thickness of the plastic material forming the molding along selected lengths.

Description of the drawing

FIG. 1 is an isometric view of a one-piece vehicle climate control actuating device of this invention, as manufactured;

FIG. 2 is a view similar to FIG. 1, but showing the device following a preliminary folding thereof as the device is manipulated into the orientation in which it is utilized in a motor vehicle;

FIG. 3 is a view similar to FIG. 2, but showing the device in a more advanced state of manipulation with the attachment means joined to form a closed loop and the operating lever extending through the slot in the main body;

FIG. 4 is a view similar to FIG. 3, but showing the device in the orientation in which it is utilized in a motor vehicle;

FIG. 5 is a sectional view taken along the line 5—5 of FIG. 4; and

FIG. 6 is an isometric view of the device as illustrated in FIG. 4 and including the instruction legend panel and decorative-mounting bezel used in conjunction therewith.

Detailed description of the invention

Referring now in detail to the drawings and in particular to FIG. 1 wherein the actuating device of this invention is illustrated as it is manufactured and is denoted by the numeral 10, this device may be seen to be generally planar and having a main body 12 with opposed sides 14 and 16 and opposed ends 18 and 20. Sides 14 and 16 have lengths substantially greater than ends 18 and 20. Main body 12 has a pair of longitudinally extending slots 22 and 24 formed therethrough and essentially round hole 26 also extending therethrough. An aperture 28 is formed through the bottom surface of a recessed portion of main body 12.

A projection 30 extends from end 20 of main body 12 and includes three portions 30a, 30b and 30c. Projection portion 30a is connected to main body end 20 by integrally formed hinge 32, formed as are all other integrally formed hinges included in this device and to be described below by decreasing the thickness of the plastic material comprising the molding along selected lengths thereof. Projection portion 30a is joined to portion 30b by hinge 34 and portion 30c is connected to 30b by hinge 36. Projection portion 30c has formed therethrough an elongate slot 37. An operating lever 38 is connected to projection portion 30b and includes a generally triangular element 40 having a projection 42 extending from one apex thereof. An enlargement 44 is formed on projection 42 in order to facilitate the mounting of a handle that may easily be grasped by a vehicle operator. The connection between lever 38 and projection portion 30b comprises a hinge 46.

A second projection 48 extends from main body end 20 in parallel relationship to projection 30. Projection 48 includes projection portions 48a, 48b and 48c. Portion 48a is connected to main body end 20 by hinge 50 and to projection portion 48b by hinge 52. Projection portion 48c is connected to portion 48b by hinge 54 and has formed therethrough a longitudinally extending slot 56. A second operating lever 58 extends from projection portion 48b in a direction remote from projection 30. Lever 58 includes a generally triangular portion 60 having an extension 62 projecting from one apex thereof. An enlargement 64, facilitating the mounting of a knob or handle, is formed on projection 62. The connection between operating lever 58 and projection portion 48b comprises a hinge 66.

Projecting from end 18 of main body 12 is a projection 68 having a longitudinally extending tab 70 extending therefrom. Projection 68 is connected to main body end 18 by a hinge 72. A similar projection 74, having a tab 76, extends from main body end 18 and is connected thereto by a hinge 77.

A pair of feet 78 and 80 are connected to main body side portions 14 and 16, respectively. Hinges 82 and 84 form the connection between feet 78 and 80, respectively, and the main body 12. Foot 78 includes ribbed portions 78a giving structural strength to foot 78, and holes 78b and 78c formed through rib portions 78a. In like manner, foot 80 has ribbed portions 80a. Extending from rib portions 80a are fingers 80b and 80c having prongs 80d and 80e respectively, extending therefrom. Prongs 80d and 80e are oriented such that they will register with holes 78b and 78c, respectively, when feet 78 and 80 are swung about hinges 82 and 84 respectively and moved toward one another. The dimensions of prongs 80d and 80e are such that they will be received in holes 78b and 78c respectively, in an interference fit.

A second pair of feet 86 and 88 are secured to main body sides 14 and 16 respectively by hinges 90 and 92 and are located along the sides of main body 12 approximate to end 20. Foot 86 is similar in construction to foot 78 and foot 88 is similar in construction to foot 80 as may be observed from the drawings and no need is seen herein to detail the precise configuration of feet 86 and 88.

As is best illustrated in FIGS. 2 and 3, projection portion 30c has formed thereon an attachment extension 94 and extension portion 30a has formed thereon an attachment extension 96. A similar attachment extension 98 is formed on an extension portion 48. These attachment extensions are provided to facilitate the mounting of control wires or cables to device 10 in order to transmit the manually motivated movements of operating levers 38 and 58 to the climate control mechanism of the vehicle. These attachment extensions may be drilled to permit attachment of the control wires or cables or the wires or cables may be attached by clips or suitable joining techniques.

The progressive manipulation of the device 10 from the "as manufactured" orientation illustrated in FIG. 1 to the orientation of the device when it is assembled in a motor vehicle is illustrated progressively by FIGS. 2, 3 and 4. FIG. 2 illustrates that projections 30 and 48 are first folded about hinges 32, 34, 36, 50, 52 and 54 towards projections 68 and 74 that are folded about hinges 72 and 77 respectively. Operating levers 38 and 58 are folded about hinges 46 and 56, respectively, so that they lie in a plane substantially perpendicular to the plane of main body 12.

From FIG. 3 it may be seen that projection 30 is joined to projection 68 and projection 48 is joined to projection 74. This joining of projections is possible due to the slots 37 and 56 formed through projections 30 and 48, respectively, and the tabs 70 and 76 extending from projections 68 and 74, respectively. The dimensions of these slots and tabs are such that tabs 70 and 76 are received in interference fits in slots 37 and 56, respectively, thereby securing the projections together as illustrated in FIG. 3.

Upon the securing of the projections together, it may be observed that a pair of closed loops are formed. A first loop includes main body 12, projection 30 and projection 68. The second loop includes main body 12, projection 48 and projection 74. Operating levers 38 and 58 are, at this time, arranged such that they extend through slots 24 and 22 respectively, so that operating lever projections 42 and 62 extend beyond the reverse side of main body 12 as best illustrated FIG. 4.

Operating lever projections 42 and 62 may be grasped by a vehicle operator and moved along the length of slots 24 and 22, respectively. This movement, of course, causes a following movement of attachment extensions 94, 96 and 98 that is transmitted by means of the control cables or wires mentioned above to the vehicle climate control mechanisms.

FIG. 4 illustrates the orientation of device 10 as it is utilized in a motor vehicle. It may be seen from FIG. 4 that feet 78 and 80 have been folded about hinges 82 and 84, respectively, so that prongs 80d and 80e are received within apertures 78b and 78c, respectively. The prongs may be held permanently in these apertures by deforming the end of the prongs as illustrated in FIG. 5. In like manner, feet 86 and 88 have been folded about hinges 90 and 92, respectively, such that the prongs on foot 88 extend into the apertures formed and foot 86.

FIG. 6 illustrates the manner in which device 10 is mounted in a motor vehicle and its cooperation with the mounting structure. The bulk of the device 10 is positioned on the side of the motor vehicle instrument panel remote from the passenger compartment with main body 12 extending through an aperture in the instrument panel and into the passenger compartment. A translucent panel 100 is positioned between operating lever projections 44 and 64 and bears legends instructing the vehicle operator concerning the correct utilization on operation of the motor vehicle climate control mechanism. A mounting bezel 102, having a decorative flange 104 is secured to main body 12. Bezel 102 has a pair of longitudinally extending slots 102a (one shown), through which extend projections 44 and 64 of the operating levers of device 10. A central aperture 102b extends through bezel 102 through which the legend on the translucent panel 100 are observable. These legends may be illuminated for observation during periods of decreased illumination by means of the light bulb that may extend through hole 26 formed in main body 12. An auxiliary control member such as the operating lever for a blower switch may be positioned to extend through aperture 28 in main body 12, and aperture 100a in panel 100 and an aperture 102c in bezel 102.

It may thus be seen that this invention provides a one-piece molding of plastic material that is manufactured as a substantially planar element and that may be manipulated to form a one-piece vehicle climate control actuating device. This one-piece actuating device may be utilized in lieu of the multi-element conventional vehicle climate control actuating assembly conventionally used in motor vehicles.

It is to be understood that this invention is not limited to the exact construction illustrated and described above or the abstract preceding this description, but that various changes and modifications may be made without departing from the spirit and scope of the invention.

I claim:
1. An article of manufacture comprising: a unitary, generally planar, molded body having an opening therethrough, two leg portions hingedly connected to said body on opposite sides of said opening, one of said leg portions having at least two sections hingedly connected together, an operating lever hingedly connected to at least one section of said one leg portion, said leg portions capable of being folded relative to said body and joined together to form a closed loop including said body said operating lever capable of being folded about its connection with said one leg portion to a degree sufficient to permit a free end of said lever to extend through the opening in said first body portion.

2. The article of claim 1, wherein each of the hinged connections between elements of said body are formed by reducing the thickness of the material forming said molded body along a desired length.

3. The article of claim 1, wherein the material forming said molded body is plastic.

4. The article of claim 1, wherein said leg portions include cooperating attaching means including a projection on one of said leg portions and an aperture on the other of said leg portions adapted to receive said projection in an interference fit.

5. The article of claim 4, wherein said one leg portion includes a first section hingedly connected to said body portion, a second section comprising one of said attaching means, and a third section hingedly connected to both said first and second sections, said operating lever connected to said third section.

6. A one-piece article of manufacture adapted to be manipulated to form vehicle climate control actuating device and comprising a molding of plastic material having an elongate main body including a pair of sides and a pair of ends, said main body having a slot formed therethrough, an elongate projection extending from one of said main body ends and attached thereto by first integrally molded hinge means, the longitudinal axis of said projection being substantially parallel to the longitudinal axes of said main body, said projection having two portions attached to one another by second integrally molded hinge means, a manually operable control lever extending from said projection transversely of the longitudinal axis of the latter and attached to said projection by third integrally molded hinge means, the thickness of said lever being less than the width of said slot and a pair of attachment means capable of being interlocked, one of said attachment means attached to the end of said projection remote from said first hinge means by fourth integrally molded hinge means, the other of said attachment means attached to the other of said main body ends by fifth integrally molded hinge means, said first to fifth hinge means permitting the parts of said device to be manipulated so that said attachment means are interlocked and said control lever extends through said slot.

7. The device according to claim 6, wherein said first to fifth hinge means are formed by reducing the thickness of the plastic material forming the molding along a desired length.

8. The device according to claim 6, further including a pair of structural members, each of said structural members extending from one of said main body sides and hingedly connected to said main body, cooperating attachment means on each of said structural members for securing said members together in a closed loop with said main body when said structural members are folded into positions substantially perpendicular to the plane of said main body.

9. The device according to claim 8, wherein said last-mentioned attachment means comprise a pin extending from one of said structural members and an aperture in the other of said structural members adapted to receive said pin in an interference fit.

10. The device of claim 6, further including at least one attachment tab means operatively secured to said control lever for movement therewith and adapted to have secured thereto at least one control cable of a vehicle climate control device.

11. The device according to claim 10, wherein said control lever has an essentially triangular configuration, said third hinge means extending along at least a portion of the length of one of the triangle sides, and including two attachmet tabs, each of said tabs located proximate one of the triangle apexes at each end of said triangle sides.

12. The device according to claim 10, including nonplanar configuration means formed on said structural members and imparting structural strength thereto.

References Cited

UNITED STATES PATENTS

| | | | |
|---|---|---|---|
| 966,325 | 8/1910 | Gilbert | 74—523 X |
| 1,389,728 | 9/1921 | Akimoff. | |
| 3,222,950 | 12/1965 | Winter | 74—519 |

MILTON KAUFMAN, *Primary Examiner.*

US. Cl. X.R.

74—491; 264—295